United States Patent [19]

Witherow

[11] 4,428,675
[45] Jan. 31, 1984

[54] METHOD OF AND APPARATUS FOR DOUBLE-EXPOSURE HOLOGRAPHIC INTERFEROMETRY

[75] Inventor: William K. Witherow, Huntsville, Ala.

[73] Assignee: The United States of America as represented by the Administrator of the National Aeronautics and Space Administration, Washington, D.C.

[21] Appl. No.: 274,708

[22] Filed: Jun. 17, 1981

[51] Int. Cl.³ .......................................... G01B 9/025
[52] U.S. Cl. ................................................... 356/347
[58] Field of Search ................. 356/347, 348; 372/68, 372/97

[56] References Cited

U.S. PATENT DOCUMENTS 3,603,684  9/1971  Wuerker ............................. 356/348
3,934,461  1/1976  Heflinger et al. ............... 356/347 X
3,970,390  7/1976  Heflinger et al. .................. 356/348

OTHER PUBLICATIONS

Fagot et al., "Controls of Aeronautical Structures...", *Proc. SPIE* vol. 210, pp. 154–158, 1979.
Armstrong et al., "Double-Pulsed Time Differential Holographic Interferometry", *Applied Optics*, vol. 16, No. 1, pp. 229–232.

*Primary Examiner*—William L. Sikes
*Assistant Examiner*—Matthew W. Koren
*Attorney, Agent, or Firm*—Joseph H. Beumer; John R. Manning; Leon D. Wofford, Jr.

[57] ABSTRACT

Double-exposure holographic interferometry is carried out using first and second lasers (11), (12) responsive to respective applied firing signals for producing respective pulsed output beams. An optical system is provided oriented such that the output beams of the lasers produce coinciding scene (20) and reference (21) beams. An initiator circuit (30) generates and applies a firing signal to the first laser (11); and a timer/firing device (31), responsive to the generation of a firing signal by the initiator circuit (30), generates and applies a firing signal to the second laser (12) a predetermined period of time later.

4 Claims, 2 Drawing Figures

METHOD OF AND APPARATUS FOR DOUBLE-EXPOSURE HOLOGRAPHIC INTERFEROMETRY

ORIGIN OF THE INVENTION

The invention described herein was made by an employee of the U.S. government, and may be manufactured and used by or for the Government for government purposes without the payment of any royalties thereon or therefor.

DESCRIPTION

1. Technical Field

This invention relates to a method of and apparatus for double-exposure holographic interferometry which is used to record successive instants in the history of an object under investigation.

2. Background Art

U.S. Pat. No. 3,934,461 discloses a technique in which a "Q-switched" solid-state (e.g., ruby) laser produces a pair of consecutive pulses of coherent light with a pulse duration of about 60 nanoseconds and an energy of about 3 joules. An optical system associated with the laser divides its output into a reference beam directly incident on a high-resolution photographic plate, and a scene beam incident on the object under investigation which provides scattered light to the photographic plate. The double pulse produced by the laser doubly exposes the plate, which is subsequently developed and then illuminated with a coherent light to provide a visual reproduction of the object in full three-dimensional detail that reveals, in terms of interference fringes, subtle changes in the dimensions of the object or its position which take place within the time interval between the pulses.

Mechanical constraints in the switching system limit the separation time between consecutive pulses to the range 60–800 usec. Furthermore, it is found that the actual separation time is apt to vary from one set of double pulses to the next, despite the same selected separation time. Finally, the maximum energy available for the second pulse of a doubly-pulsed laser is functionally related to the time interval between pulses, with the result that the energy in the second pulse under some conditions will be less than the energy in the first pulse, thereby degrading the resultant photographic record.

In another type of double-exposure holographic interferometry, a contour hologram is recorded on a medium by double exposure of the medium at two closely adjacent optical frequencies which determine the contour spacing. U.S. Pat. No. 3,970,390 discloses this so-called double-exposure technique and indicates that, between successive exposures, the object under investigation must remain absolutely stationary within a fraction of a wavelength of the coherent light. Thus, for applications in which this type of double-exposure technique is suitable, the time interval between successive exposures should be as brief as possible. The U.S. Pat. No. 3,970,390 patent discloses an arrangement in which a pair of ruby lasers are oriented so that the output of each is incident on what is termed a movable frequency selector that has two possible positions for reflecting light along a common path from either of the two lasers. One of the lasers emits light at the R1 line, which is the usual mode of operation, and the other emits light at the R2 line by thwarting the gain at the R1 wavelength. The two rubies are pumped concurrently and the frequency selector moved between its two positions, producing successive bursts of light at slightly different frequencies. The time interval between these bursts is, however, dependent on the mechanical mechanism by which the frequency selector is moved. For objects that move within such interval, this technique is unsatisfactory.

Finally, U.S. Pat. No. 3,603,684 discloses apparatus for carrying out contour holography in which a pair of lasers are mounted coaxially, the lasers being identical but held at different temperatures or being of different materials such that an object under investigation is illuminated by two closely adjacent optical frequencies. Each laser has its own energizing circuit, and the patentee states that two separate exposures may be made on a film record to obtain the desired contour spacing by energizing the lasers sequentially. No arrangement for achieving this is disclosed, however.

It is, therefore, an object of the present invention to provide a new and improved method of and apparatus for double-exposure holographic interferometry which does not suffer from the deficiencies outlined above.

DISCLOSURE OF INVENTION

According to the present invention, double-exposure holographic interferometry is carried out by apparatus comprising first and second lasers responsive to respectively applied firing signals for producing respective pulsed output beams, and an optical system orienting the lasers so that their output beams produce coinciding scene and reference beams, respectively. An initiator circuit is provided for generating and applying the firing signal to the first laser. Finally, a timer/firing device, responsive to the generation of a firing signal by the initiator circuit, generates and applies a firing signal to the second laser a predetermined period of time after the firing signal is applied to the first laser. In this manner, the firing of the second laser is electronically carried out, permitting the time interval between the firing of the lasers to be as small as 10 nanoseconds. Preferably, the period of time developed by the timer/firing device is adjustable, allowing the second pulse to follow the first pulse by an arbitrarily selectable time interval.

The timer/firing device may sense the lasing of the first laser in order to begin the timing of the predetermined period of time, starting with the lasing of the first laser. Alternatively, the timer/firing device can begin timing the predetermined time interval in response to the generation of a firing signal produced by the initiator circuit.

BRIEF DESCRIPTION OF THE DRAWINGS

Embodiments of the present invention are disclosed in the accompanying drawings, wherein.

DETAILED DESCRIPTION

Figure 1:
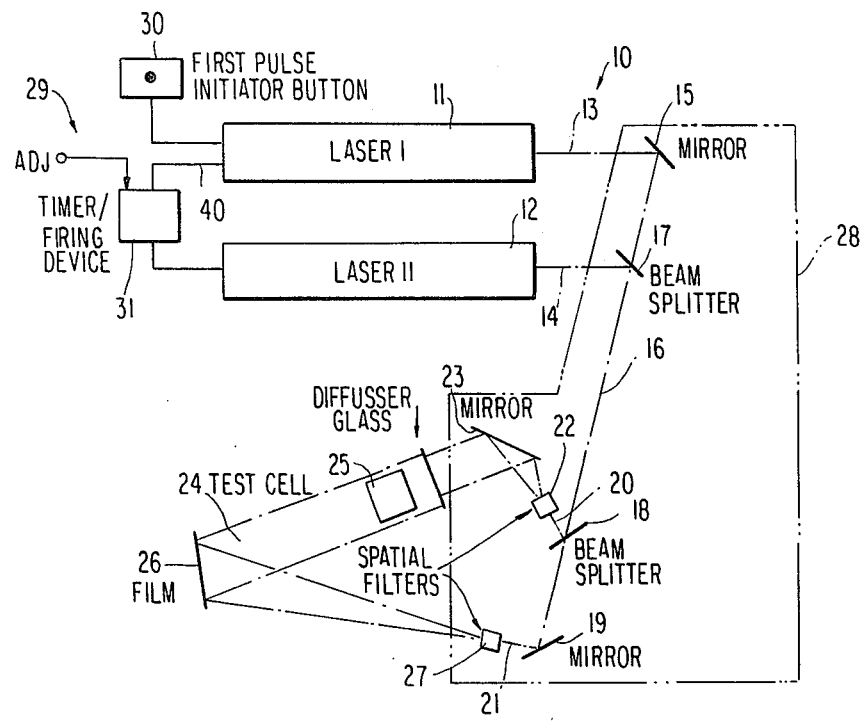
FIG. 1 is a block diagram of a first embodiment of the present invention in which the time for firing the second laser begins as a consequence of sensing the lasing action of the first laser.

Referring now to FIG. 1, reference numeral 10 designates a first embodiment of the present invention for carrying out double-exposure holographic interferometry. Apparatus 10 includes a pair of lasers 11 and 12, each of which is responsive to an applied firing signal for producing a pulsed output beam indicated by lines 13, 14, respectively. Each of lasers 11 and 12 may be ruby pulsed lasers such as TRW Model 1200M manufactured by TRW Inc.

Beam 13 from laser 11 is incident on reflector 15, which is inclined relative to beam 13, producing a reflected beam 16 that passes through beam-splitter 17 such that beam 14 produced by laser 12, and incident on beam-splitter 17, also follows path 16. This situation arises because of the equal angular relationship between reflector 15 and beam-splitter 17. Beam 16 is incident on beam-splitter 18 and reflector 19 for the purpose of creating a scene beam 20 and reference beam 21.

Scene beam 20, after passing through spatial filter 22, is incident on mirror 23, which directs the scene beam through test cell 24, containing object 25 which is to be studied. The remaining scene light is incident on photographic film 26 for producing a holographic image thereon. Spatial filter 22 serves to convert the raw beam output of a laser into a divergent, uniformly intense beam so that a relatively large scene area can be investigated. A diffuser glass interposed between mirror 23 and test cell 24 provides a white background when the object is clear or transparent. Other types of holographic setups may not require a diffuser plate.

Reference beam 21, as it passes through spatial filter 27, is also incident on photographic plate 26, so that the combination of the scene beam and the reference beam on the photographic plate will produce a holographic image of object 25.

As a consequence of the optical system designated generally by reference numeral 28, each of the beams produced by lasers 11 and 12 produce coinciding scene and reference beams. That is to say, images can be produced on film plate 26 in sequence as rapidly as lasers 11 and 12 can be fired sequentially.

In order to control the firing of the lasers, firing control circuitry 29 is provided. Circuitry 29 comprises initiator circuit 30, which is conventionally supplied with a Model 1200M laser, and which may be operated manually for the purpose of generating and applying a firing signal to laser 11 in a conventional manner. Circuit 29 also includes timer and firing device 31 coupled to laser 11, and constructed and arranged so as to fire laser 12 a predetermined period of time subsequent to the firing of laser 11. To achieve this, as shown in FIG. 1, timer/firing device 31 senses the lasing of laser 11 by reason of a signal appearing in output plug 40, and begins the operation of a timer.

A Model 1200M laser is provided with an internal pulse system that produces, at output plug 40 of laser I, a signal that is normally coupled to a CRT that enables the power output of this laser to be monitored. The signal at plug 40 is applied, in this invention, to timer/firing device 31, which develops a firing signal a predetermined period of time after the lasing of the first laser begins and applies the firing signal to laser 12. The beam produced by laser 12 is subsequent in time to the beam produced by laser 11 by an interval equal to the timer interval established by timer/firing device 31. Preferably, timer/firing device 31 is digitally operated, and is provided with adjustment 32 for selecting the time interval between the pulsing of laser 12 following the pulsing of laser 11.

Timer/firing device 31 may be a Dual Channel Space Time Delay pulse generator manufactured by the Phase-R Corporation of New Durham, N.H. This device is accurate to 10 nanoseconds, and has a variable time control.

Using conventional circuitry in timer/firing device 31, the time interval between the pulsing of the two lasers can be as small as 10 nanoseconds; and by providing adjustment 32, the time period can be adjusted to any value greater than this.

As a consequence of the device described above, each pulse of the double-exposure hologram produced on film 26 originates from a different laser. This permits each pulse to contain maximum energy, inasmuch as there is no recovery time involved for the lasers. Furthermore, the time separation between the pulses can be varied over a much wider range than is the case using a sequentially-pulsed single laser, so that different types of phenomena that previously could not be studied by holographic interferometry can now be examined.

The lasers suitable for use in the present invention can be conventional ruby lasers, or other types of lasers such as argon-ion, dye, and Nd-Yag lasers.

Lasers 11 and 12 may be of identical material (e.g., red ruby), and the embodiments may be used to obtain holographic information that deals with size changes or movements of an object within very short periods of time (e.g., 10 nanoseconds). In such case, the reference and scene beams will be identical in length and number of reflections. In the case of contour holography, where slightly different wavelengths are involved, the reference beam may differ slightly from the scene beam.

Figure 2:
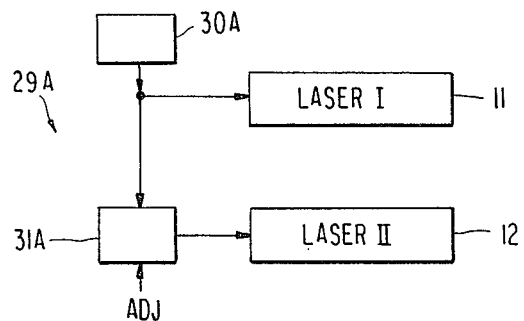
FIG. 2 is a block diagram of a second embodiment of the present invention, wherein the timing of the firing of the second laser begins upon detection of the application of a firing signal to the first laser.

Referring now to the second embodiment of the invention, shown in FIG. 2, reference numeral 29A designates a modified firing circuitry for controlling the pulsing of the lasers. Specifically, circuitry 29A includes initiator circuit 30A, which generates and applies a firing signal to laser 11 in response to a manual input. Circuit 30A, however, also applies a portion of the firing signal to timer/firing device 31A such that the timing circuit therein begins timing in response to the generation of the firing signal applied to laser 11. Device 31A generates and applies a firing signal to laser 12 a predetermined period of time subsequent to the generation of the firing signal produced by initiator 30A.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

I claim:

1. In apparatus for double-exposure holographic interferometry having a laser responsive to an applied firing signal for producing a pulsed output beam, an optical system for splitting the output beam into a reference beam and a scene beam, and an initiator circuit for generating and applying a firing signal to the laser, the improvement comprising:
    (a) a second laser responsive to an applied firing signal for producing a pulsed output beam which is substantially parallel to the beam produced by said first laser and which is split by said optical system into reference and scene beams that substantially coincide with the reference and scene beams produced by said optical system; and
    (b) a timer/firing device responsive to the firing of the first laser for generating and supplying a firing signal to the second laser a predetermined period later.

2. The improvement of claim 1 wherein said predetermined period of time is adjustable.

3. The improvement of claim 1 wherein the timer/firing device senses the lasing of the first-mentioned laser and begins timing said predetermined period of time based on such lasing.

4. Apparatus for carrying out double-exposure holographic interferometry comprising:
 (a) first and second lasers responsive to respective applied firing signals for producing respective pulsed output beams;
 (b) an optical system orienting the lasers so that their output beams produce substantially coinciding scene and reference beams;
 (c) an initiator circuit for generating and applying a firing signal to the first laser;
 (d) a timer/firing device responsive to the generation of the firing signal by the initiator circuit for generating and applying a firing signal to the second laser a predetermined period of time later, said timer/firing device being adapted to sense the lasing of the first laser and to beging timing said predetermined period of time starting with the lasing of the first laser.

* * * * *